H. KRUSE.
WAGON.
No. 16,060.　　　　　　　　Patented Nov. 11, 1856.
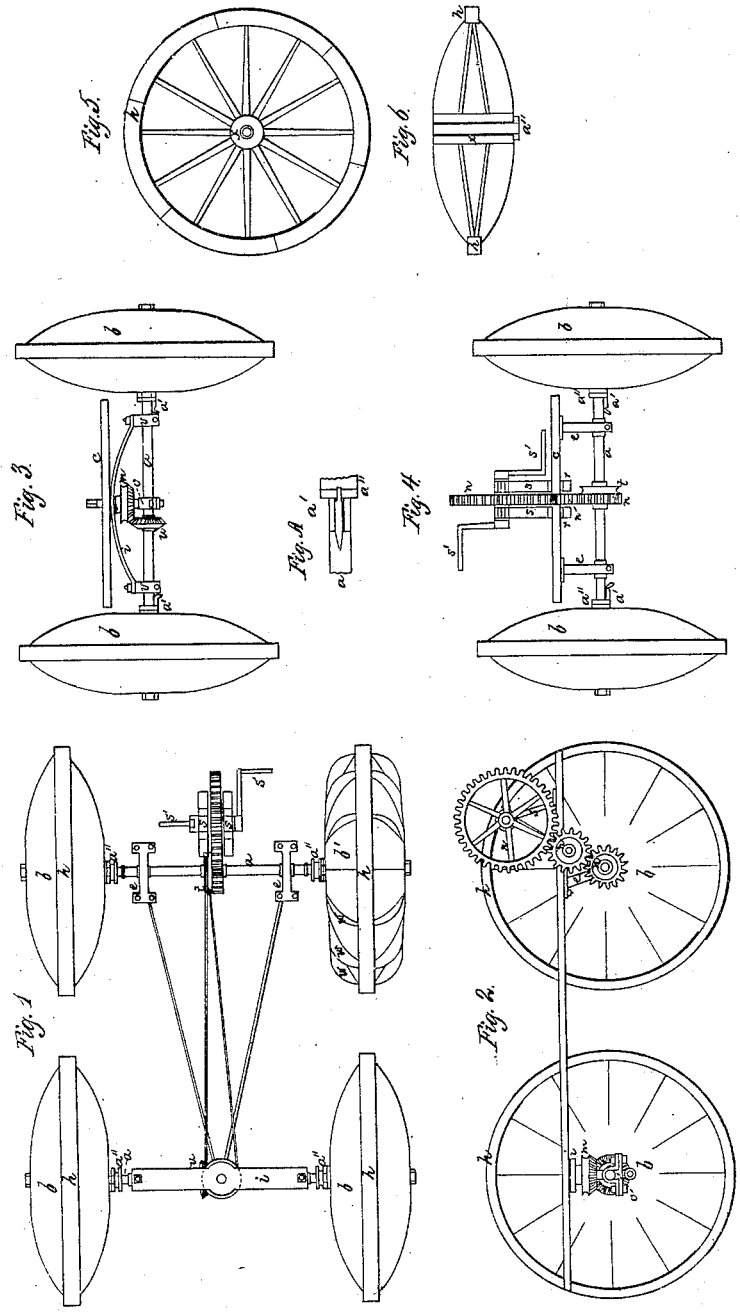

UNITED STATES PATENT OFFICE.

HENRY KRUSE, OF NEW ORLEANS, LOUISIANA.

WAGON.

Specification of Letters Patent No. 16,060, dated November 11, 1856.

*To all whom it may concern:*

Be it known that I, HENRY KRUSE, of the city of New Orleans, parish of Orleans, State of Louisiana, have made a new and useful Improvement in Wagons; and I hereby declare the following is a full and exact description thereof, reference being had to the accompanying drawings, and the letters of reference marked thereon, making a part of this specification, the same letters in each view used to designate the same parts.

The object of this invention is to combine the advantage of transporting substances on land; also in the crossing of streams, which the water is too deep for fording, the wheels having a buoyant power sufficient to support the load, when made use of in the crossing of streams, and when made use of on land to be hauled by teams similar to a common wagon, the arrangement for the teams to be attached to the wagon, the same as that made use of in common wagons—viz., wagon-tongue, &c., attached to the fore axle, which is not shown in the drawing, being no part of the novelty and so well understood it is deemed unnecessary to do so.

The scale on the drawings, owing to the many variations of sizes and the applications of the wagon, cannot be as essential as many other subjects require, in this case, however, may advise in the construction of a wagon made of similar dimensions, the wheels ($b$) as shown in Figures 1, 2, 3, 4. Their sides are metallic disks, made to be water tight; their edges securely fastened to the fellies ($h$), shown in Fig. 6, and the centers of their disks made fast to hub ($x$), as shown in Fig. 5. The metal to make those disks—namely, iron or other common metal—must necessarily be light, in order to secure as much buoyancy as possible, the interior wheel, as shown by Fig. 5, supporting the weight the wheel has to support, the spokes placed in an angular position, as seen by Fig. 6, to brace or support the fellies in their true position, so that the metallic disks will not be injured, or rendered inefficient in the uses they are intended to fill.

On the sides of the wheels ($b$) there are propelling blades, the edges of these propellers shown on the sectional side elevation, Fig. 2, and on the wheel $b'$, Fig. 1, these propelling blades shown in their respective positions, when used in the water or when the wagon is made available for the crossing of streams, said propelling blades marked ($w$), and are only used when the wheels are made propellers, in their construction made to be fastened to the sides of the disks with screws or dove tail seats, that will admit of a ready and secure attachment to the disks.

The axles ($a$) have couplings marked ($a'$) as seen in Fig. 1. The object of the couplings is to have the wheels ($b$) revolve with the axles ($a$) when the axles ($a$) are actuated by the cranks $s'$ made use of in the turning wheels ($n\ n\ n$), one of these wheels fastened on the hind axle, as seen by Figs. 1 and 2, also the rear elevation Fig. 4, the other wheels mounted on stands ($s, s$) and ($r, r$). When the wagon is required to be used on the land, the couplings are to be detached from the wheels ($b$), to allow the wheels to revolve on the axles, the propelling force being applied to the hind axle as described, this power being communicated to the fore axle by the use of a chain passing around the sheave ($t$) on the hind axle and the sheave ($m$) on the fore axle, as seen by Fig. 1, the sheave ($m$), as seen by Fig. 3, attached to a bevel wheel, working into another bevel wheel ($u$) fastened to the fore axle, there being a bolt passing through the bevel wheel ($m$), marked ($o$). This bolt made, clamps the axle, and held in its position on the axle by the cap and screws, as seen by Figs. 2 and 3, the bed of the wagon, holding the upper end of this bolt in a vertical position, the floor of the wagon body marked ($c$), as seen by Figs. 2, 3 and 4, the spring ($i$), as seen by Figs. 1, 2 and 3, mounted on the bearers, as seen by Fig. 3, marked ($v$), and thus attached to the axle, the spring supporting the wagon bed, and admits the forward axle to vibrate, as common wagons, in the changing of direction required. On the top of the bolt ($o$) a crank lever can be shipped when required to give the means of directing the course, by the action on the lever, when in the wagon bed, in the case of steering or guiding the wagon when used in water.

The wagon bed on the after axle is mounted on stands ($e$) as seen by Figs. 2 and 4, said stands attached to the axle to admit the axle to revolve in the same, there being stay rods to attach the axles, as seen in Fig. 1, said stay rods being attached at one end to the stands ($e$), and the other end to the lower side of bolt ($o$), so as to admit of the forward axle vibrating independent of the stays which support the after axle in its correct position.

After this my description in general terms of the whole, I will designate the respective figures.

Fig. 1, top view, showing the wagon, with the mechanical combination; in this view the body of the wagon is not shown, as it would render the arrangement of whole obscure, having wheels ($h$), one wheel $h'$ showing the appearance of the wheels when the propellers are on, axles ($a$), gear wheels ($n, n, n$), stands for same ($s$), cranks $s'$, bed bearers, spring ($i$), and stands ($e$), with chain around sheaves ($t$) and ($m$), stay rods connecting axles; Fig. 2, section side elevation showing the floor of the wagon bed ($c$), wheels ($n, n, n$) to drive the wagon, as described heretofore; Fig. 3, front elevation showing the axle ($a$) on which are mounted the bevel wheels ($m$) and ($u$), edge of spring ($i$), end of wagon bed ($c$), center bolt ($o$), bearers for spring ($i$), marked ($v$); Fig. 4, rear elevation showing the mode of mounting the wheels ($n, n, n$) and the floor of the wagon bed on the stands, as described; Fig. 5, the interior wheel made to support the load the wagon is to sustain, the fellies ($h$), the hub ($x$), with spokes attached to the hub and the felly; Fig. 6, sectional transverse view of the wheels ($b$), shows the mode of forming the hub and the angular position of the spokes to support the fellies ($h$) from injuring the metallic disks in any yielding from their correct position. The metallic disks attach to the sides of the fellies and the ends of the hub of the wheel, as described, showing the clutch for the coupling ($a'$) to catch the ends of the hub ($x$).

After this my description of improvement in wagons, what I claim as my invention, and desire to secure by Letters Patent, is—

The application to wagons, of wheels made buoyant, by the use of disks, that will cause the wagon to be supported in water from such buoyancy; with the application of propelling blades on said wheels, to cause the wheels to be available in propelling the wagon in water, and the same wheels by removing the propelling blades can change the wheels so that they are available in their uses in the transporting of substances on land, similar to common wheels of wagons.

HENRY KRUSE. [L. S.]

Sealed and signed in the presence of—
R. H. BRADFORD,
FRANCIS ARMSTRONG.